(12) United States Patent
Malatack et al.

(10) Patent No.: US 9,225,840 B2
(45) Date of Patent: Dec. 29, 2015

(54) SYSTEM AND METHOD FOR PROVIDING A COMMUNICATION ENDPOINT INFORMATION SERVICE

(71) Applicant: Twilio, Inc., San Francisco, CA (US)

(72) Inventors: Patrick Malatack, San Francisco, CA (US); Cheuk To Law, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

(21) Appl. No.: 14/309,334

(22) Filed: Jun. 19, 2014

(65) Prior Publication Data

US 2014/0376543 A1    Dec. 25, 2014

Related U.S. Application Data

(60) Provisional application No. 61/836,937, filed on Jun. 19, 2013.

(51) Int. Cl.
| | |
|---|---|
| *H04M 7/00* | (2006.01) |
| *H04M 1/247* | (2006.01) |
| *H04W 84/18* | (2009.01) |
| *H04L 29/06* | (2006.01) |

(52) U.S. Cl.
CPC .......... *H04M 7/0036* (2013.01); *H04M 1/2473* (2013.01); *H04L 65/1013* (2013.01); *H04M 2203/2038* (2013.01); *H04W 84/18* (2013.01)

(58) Field of Classification Search
None
See application file for complete search history.

(56) References Cited

U.S. PATENT DOCUMENTS

| | | |
|---|---|---|
| 5,274,700 A | 12/1993 | Gechter et al. |
| 5,526,416 A | 6/1996 | Dezonno et al. |
| 5,581,608 A | 12/1996 | Jreij et al. |
| 5,598,457 A | 1/1997 | Foladare et al. |
| 5,934,181 A | 8/1999 | Adamczewski |
| 6,026,440 A | 2/2000 | Shrader et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |

(Continued)

FOREIGN PATENT DOCUMENTS

| | | |
|---|---|---|
| DE | 1684587 A | 3/1971 |
| EP | 0282126 A | 9/1988 |

(Continued)

OTHER PUBLICATIONS

Complaint for Patent Infringement, *Telinit Technologies, LLC* v. *Twilio Inc.*, dated Oct. 12, 2012.

(Continued)

*Primary Examiner* — Jackie Zuniga Abad
(74) *Attorney, Agent, or Firm* — Jeffrey Schox

(57) ABSTRACT

A system and method for providing a telephony endpoint information service at a communication platform includes obtaining information of a first endpoint through a set of information collection processes; storing the obtained information in an endpoint repository; receiving an endpoint query request of a communication event, wherein the endpoint query request specifies at least a first endpoint; accessing endpoint information for the first endpoint; and augmenting the communication event according to the accessed endpoint information.

25 Claims, 12 Drawing Sheets

(56) References Cited

U.S. PATENT DOCUMENTS

| | | |
|---|---|---|
| 6,269,336 B1 | 7/2001 | Ladd et al. |
| 6,373,836 B1 | 4/2002 | Deryugin et al. |
| 6,425,012 B1 | 7/2002 | Trovato et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Nance et al. |
| 6,501,832 B1 | 12/2002 | Saylor et al. |
| 6,507,875 B1 | 1/2003 | Mellen-Garnett et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Raesaenen |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,715,547 B2 | 5/2010 | Ibbotson et al. |
| 7,779,065 B2 | 8/2010 | Gupta et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,936,867 B1 | 5/2011 | Hill et al. |
| 7,962,644 B1 | 6/2011 | Ezerzer et al. |
| 7,979,555 B2 | 7/2011 | Rothstein et al. |
| 8,023,425 B2 | 9/2011 | Raleigh |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,149,716 B2 | 4/2012 | Ramanathan et al. |
| 8,150,918 B1 | 4/2012 | Edelman et al. |
| 8,233,611 B1 | 7/2012 | Zettner |
| 8,243,889 B2 | 8/2012 | Taylor et al. |
| 8,266,327 B2 | 9/2012 | Kumar et al. |
| 8,295,272 B2 | 10/2012 | Boni et al. |
| 8,306,021 B2 | 11/2012 | Lawson et al. |

(56) References Cited

U.S. PATENT DOCUMENTS

| | | |
|---|---|---|
| 8,326,805 B1 | 12/2012 | Arous et al. |
| 8,346,630 B1 | 1/2013 | McKeown |
| 8,355,394 B2 | 1/2013 | Taylor et al. |
| 8,417,817 B1 | 4/2013 | Jacobs |
| 8,429,827 B1 | 4/2013 | Wetzel |
| 8,462,670 B2 | 6/2013 | Chien et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,594,626 B1 | 11/2013 | Woodson et al. |
| 8,611,338 B2 | 12/2013 | Lawson et al. |
| 8,649,268 B2 | 2/2014 | Lawson et al. |
| 8,667,056 B1 | 3/2014 | Proulx et al. |
| 8,675,493 B2 | 3/2014 | Buddhikot et al. |
| 8,755,376 B2 | 6/2014 | Lawson et al. |
| 8,837,465 B2 | 9/2014 | Lawson et al. |
| 8,838,707 B2 | 9/2014 | Lawson et al. |
| 2001/0043684 A1 | 11/2001 | Guedalia et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0136391 A1 | 9/2002 | Armstrong |
| 2003/0006137 A1 | 1/2003 | Wei et al. |
| 2003/0018830 A1 | 1/2003 | Chen et al. |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0103620 A1 | 6/2003 | Brown et al. |
| 2003/0123640 A1 | 7/2003 | Roelle et al. |
| 2003/0195990 A1 | 10/2003 | Greenblat |
| 2003/0196076 A1 | 10/2003 | Zabarski et al. |
| 2003/0211842 A1 | 11/2003 | Kempf et al. |
| 2003/0231647 A1 | 12/2003 | Petrovykh |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0165569 A1 | 8/2004 | Sweatman et al. |
| 2004/0172482 A1 | 9/2004 | Weissman et al. |
| 2004/0205689 A1 | 10/2004 | Ellens et al. |
| 2004/0213400 A1 | 10/2004 | Golitsin et al. |
| 2004/0218748 A1 | 11/2004 | Fisher |
| 2005/0010483 A1 | 1/2005 | Ling |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2006/0008073 A1 | 1/2006 | Yoshizawa et al. |
| 2006/0015467 A1 | 1/2006 | Morken et al. |
| 2006/0047666 A1 | 3/2006 | Bedi et al. |
| 2006/0067506 A1 | 3/2006 | Flockhart et al. |
| 2006/0129638 A1 | 6/2006 | Deakin |
| 2006/0143007 A1 | 6/2006 | Koh et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0256816 A1 | 11/2006 | Yarlagadda et al. |
| 2006/0262915 A1 | 11/2006 | Marascio et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0050306 A1 | 3/2007 | McQueen |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0208862 A1 | 9/2007 | Fox et al. |
| 2007/0242626 A1 | 10/2007 | Altberg et al. |
| 2007/0265073 A1 | 11/2007 | Novi et al. |
| 2007/0286180 A1 | 12/2007 | Marquette et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0025320 A1 | 1/2008 | Bangalore et al. |
| 2008/0037715 A1 | 2/2008 | Prozeniuk et al. |
| 2008/0040484 A1 | 2/2008 | Yardley |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0134049 A1 | 6/2008 | Gupta et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0177883 A1 | 7/2008 | Hanai et al. |
| 2008/0209050 A1 | 8/2008 | Li |
| 2008/0222656 A1 | 9/2008 | Lyman |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0313318 A1 | 12/2008 | Vermeulen et al. |
| 2008/0317222 A1 | 12/2008 | Griggs et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0232289 A1 | 9/2009 | Drucker et al. |
| 2009/0235349 A1 | 9/2009 | Lai et al. |
| 2009/0252159 A1* | 10/2009 | Lawson et al. ............... 370/352 |
| 2009/0288165 A1 | 11/2009 | Qiu et al. |
| 2009/0316687 A1 | 12/2009 | Kruppa |
| 2009/0318112 A1 | 12/2009 | Vasten |
| 2010/0037204 A1 | 2/2010 | Lin et al. |

(56) References Cited

U.S. PATENT DOCUMENTS

| | | |
|---|---|---|
| 2010/0070424 A1 | 3/2010 | Monk |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0115041 A1 | 5/2010 | Hawkins et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2010/0251340 A1 | 9/2010 | Martin et al. |
| 2010/0281108 A1 | 11/2010 | Cohen |
| 2011/0029882 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0096673 A1 | 4/2011 | Stevenson et al. |
| 2011/0110366 A1 | 5/2011 | Moore et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0265172 A1 | 10/2011 | Sharma et al. |
| 2011/0267985 A1 | 11/2011 | Wilkinson et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0017222 A1 | 1/2012 | May |
| 2012/0036574 A1 | 2/2012 | Heithcock et al. |
| 2012/0039202 A1* | 2/2012 | Song .................. 370/252 |
| 2012/0114112 A1 | 5/2012 | Rauschenberger et al. |
| 2012/0149404 A1* | 6/2012 | Beattie et al. ............ 455/466 |
| 2012/0173610 A1 | 7/2012 | Bleau et al. |
| 2012/0198004 A1 | 8/2012 | Watte |
| 2012/0201238 A1 | 8/2012 | Lawson et al. |
| 2012/0226579 A1 | 9/2012 | Ha et al. |
| 2012/0239757 A1 | 9/2012 | Firstenberg et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0316809 A1 | 12/2012 | Egolf et al. |
| 2013/0058262 A1 | 3/2013 | Parreira |
| 2013/0156024 A1 | 6/2013 | Burg |
| 2013/0212603 A1 | 8/2013 | Cooke et al. |
| 2013/0244632 A1 | 9/2013 | Spence et al. |
| 2014/0064467 A1 | 3/2014 | Lawson et al. |
| 2014/0106704 A1 | 4/2014 | Cooke et al. |
| 2014/0153565 A1 | 6/2014 | Lawson et al. |

FOREIGN PATENT DOCUMENTS

| | | |
|---|---|---|
| EP | 1464418 A | 10/2004 |
| EP | 1770586 A1 | 4/2007 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 02087804 | 11/2002 |
| WO | 2006037492 A | 4/2006 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

OTHER PUBLICATIONS

RFC 3986: Uniform Resource Identifier (URI): Generic Syntax; T. Berners-Lee, R. Fielding, L. Masinter; Jan. 2005; The Internet Society.

* cited by examiner

Endpoint information Record

```
Country: US;
Region: San Francisco / Marin County;
Type: Mobile;
SMS: True;
MMS: True;
OS: iOS;
SIP-Client-App: False;
Device-model: iphone 5c;
Network: Verizon;
Data-plan: True;
Apps: [Facebook, Youtube, Quora];
Interests: {Coffee, Sports, Games, Shopping};
Camera: True;
Microphone: True;
Audio True;
Screen-Size: 1136x640;
Screen-Resolution: 326 ppi;
Common-Area-Codes: {415, 510, 650};
```

FIGURE 4

Endpoint information Record

```
Country: US;
Region: San Francisco / Marin County;
Type: Mobile;
SMS: True;
MMS: True;
Devices: [
  {Device-ID: asdkj2903jls3;
   OS: iOS;
   Device-model: iphone 5c;
   Network: Verizon;
   Data-plan: True;
   Apps: [Facebook, Youtube, Quora, SIP-App];
   Preference: 1;
   Last-Used: 16-JUN-2014;
   },
  {Device-ID: kjlajsdli3i3i;
   OS: Android 4.1.2;
   Device-model: Galaxy s3;
   Apps: [SIP-App];
   Preference: 2;
   Last-Used: 21-MAY-2013;
   },
  {Device-ID: 293iojAso03ji2H;
   OS: iOS;
   Device-model: iphone 4S;
   Network: Verizon;
   Data-plan: True;
   Apps: [Facebook, Youtube, Quora, SIP-App];
   Preference: 3;
   Last-Used: 27-SEP-2013;
   }];
Interests: {Coffee, Sports, Games, Shopping};
```

FIGURE 5

Synchronous Voice Application Instructions

SYSTEM AND METHOD FOR PROVIDING A COMMUNICATION ENDPOINT INFORMATION SERVICE

CROSS-REFERENCE TO RELATED APPLICATIONS

This application claims the benefit of U.S. Provisional Application Ser. No. 61/836,937, filed on 19 Jun. 2013, which is incorporated in its entirety by this reference.

TECHNICAL FIELD

This invention relates generally to the portable telephony field, and more specifically to a new and useful system and method for providing a communication endpoint information service in the telephony field.

BACKGROUND

The phone is becoming an increasingly important tool for communicating. In addition to traditional use as a tool for voice communication, the capabilities of the phone have expanded to media sharing, text messaging, video calls, screen sharing, and other features. While many devices offer ever expanding functionality, users also have more variety in the carrier plans to support various features. Additionally, devices can now include a range of various capabilities varying between basic phones, simple cell phones, smart phones, VoIP devices, connected smart devices, and other telephony devices. With so much diversity in the capabilities of a phone, it can be difficult for developers, carriers, and service providers to accommodate the variety of capabilities. Application developers and communication platforms are often limited to building tools that target legacy devices or to targeting those with newer capabilities and possibly alienating those with older devices or limited functionality. Thus, there is a need in the telephony field to create a new and useful system and method for providing a communication endpoint information service. This invention provides such a new and useful system and method.

BRIEF DESCRIPTION OF THE FIGURES

FIGS. 4 and 5 are exemplary endpoint information record instances;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Providing a Telephony Endpoint Information Service

Figure 1:
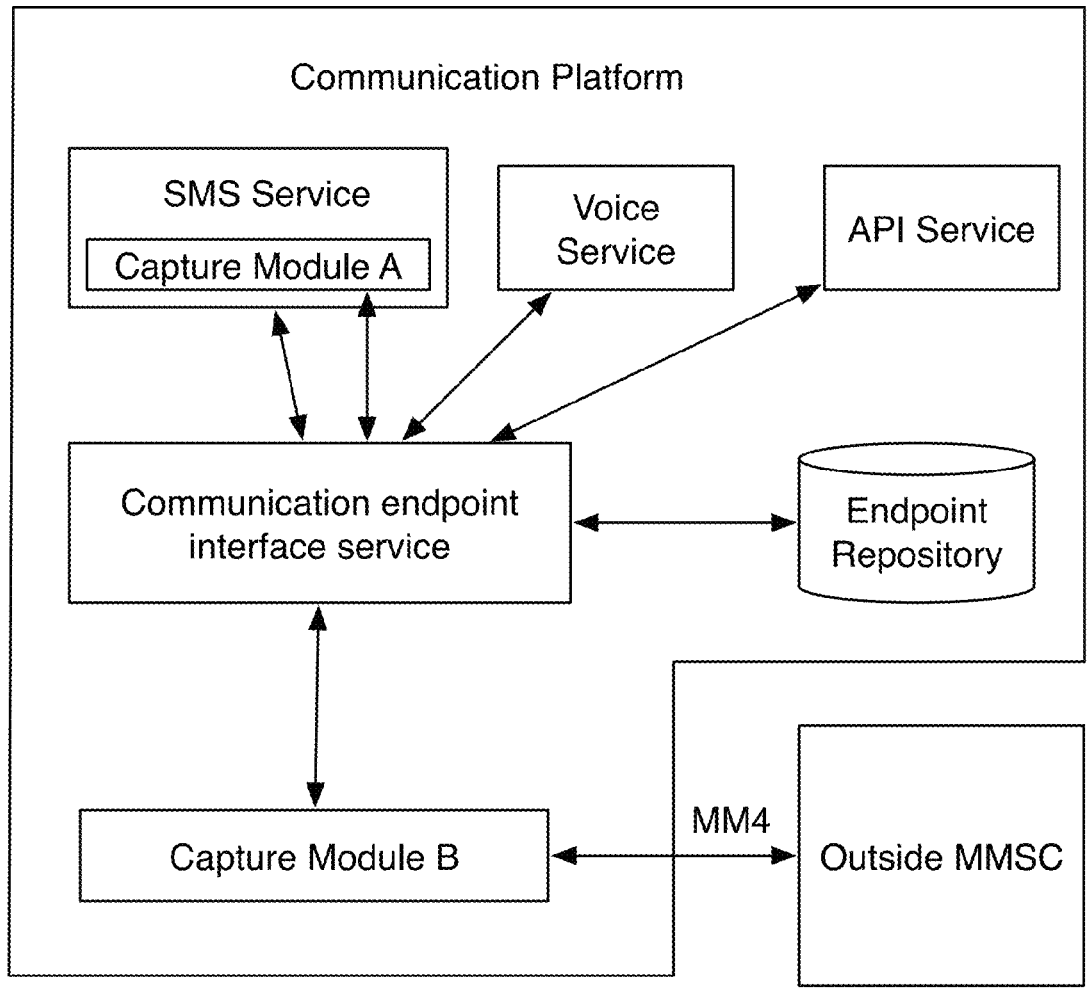
FIG. 1 is a schematic representation of a system of a preferred embodiment.

As shown in FIG. 1, a system for providing a communication endpoint information service of a preferred embodiment includes a communication endpoint interface service of a communication platform and a communication endpoint repository. The system functions to enable information of communication endpoints to be collected, accessed, and used in operational logic of a communication platform. Since capabilities can vary greatly between the devices assigned to communication endpoints, the system preferably enables capabilities to be tracked and used in operation of the communication platform. Also, the current user/owner of a communication endpoint can influence how communication should occur (e.g., what is the native language of the user).

The system is preferably incorporated into a communication platform that provides capabilities of communicating or interacting with a communication endpoint. The communication platform is preferably substantially similar to the one described in U.S. Pat. No. 8,306,021, issued 6 Nov. 2012, which is hereby incorporated in its entirety by this reference. The communication platform can alternatively have any suitable architecture or functionality. In one variation, the communication platform facilitates communicating media messages to and/or from various endpoints (e.g., provides an API for programmatic MMS messaging). The capabilities of a device to render the media message may impact how and what media is communicated to the communication endpoint. The communication platform can additionally or alternatively provide voice and/or video communication with one or more endpoints. The system can additionally collect information related to the user of the endpoint device such as language, interests, communication habits, and other suitable demographic information. The system and the communication platform are preferably implemented on a cloud hosted computing environment, but may alternatively be implemented on a computing cluster or any suitable network accessible computing environment.

A communication endpoint (or endpoint for short) is preferably an address to which PSTN, SIP, SMS, $MM_S$, OTT (over-the-top) client application communication, and/or any suitable form of communication can be directed. The medium of the communication channel can be voice/audio, video, text, virtual reality, or other suitable forms of media. The communication can additionally be synchronous (e.g., a phone call) or asynchronous (e.g., messaging). A telephony endpoint is one preferred type of communication endpoint, and telephony endpoint can be a phone number, a short code, a toll-free number, a SIP address, an application username, or any suitable address type compatible with a communication system. A client endpoint can be a SIP address (e.g., sip:username@example.com:port), an IP address, or any suitable address type. Additionally, the system is preferably configured such that information of a communication endpoint can be continuously or periodically updated to contribute new or changing information.

The communication endpoint interface service (or interface service for short) functions to provide a service interface for interacting with communication endpoints. The interface service is preferably an intermediary component between the communication endpoint repository and components of the communication platform. The interface service preferably includes an application programming interface (API) that can be used by other components for interacting with records of telephony endpoints. The API interface acts as an intermediary abstraction layer between stored endpoint information and various services of the communication platform. The communication endpoints can be endpoints owned, hosted, ported, terminated, and/or otherwise operated/managed by the communication platform, but the communication endpoints may alternatively or additionally be outside communication endpoints operated by outside entities. Even if the communication does not terminate the communication endpoint or otherwise manage the communication endpoint, information of the endpoint can be observed and collected through communication that passes through the communication platform to and from that communication endpoint. The outside communication endpoint information can be collected and observed when managed endpoints communicate with outside endpoints. By implementing the interface service in front of the endpoint repository, the components of the communication platform are independent of the inner functionality and organization of the endpoints. New features and capabilities can be added while gracefully degrading for communication endpoints that lack updated information. The interface service preferably abstracts access to communication endpoint information. Any request to inspect, call, message, start a session, request a new number, create, port, delete, and/or interact with an endpoint preferably passes through the interface service. Multiple instances of the interface service can additionally be deployed to scale the service according to demand.

The API of the interface is preferably a RESTful API but may alternatively be any suitable API such as SOAP. The API preferably works according to an HTTP request and response model. HTTP requests (or any suitable request communication) to the management service 110 preferably observe the principles of a RESTful design. RESTful is understood in this document to describe a Representational State Transfer architecture as is known in the art. The RESTful HTTP requests are preferably stateless. The components of the communication platform and/or the interface service preferably do not need to remember or store previous communications to be aware of the state. In a preferred implementation, components of the communication platform preferably call out to the interface service when interacting with a communication endpoint. In one example scenario, if the communication platform is processing a request to send a message (e.g., SMS or MMS), a messaging service, for example, can call out to the interface service to inspect properties that may impact the messaging. The supported media types and capabilities may result in altering the media delivered to the device of the communication endpoint. In another example scenario, if the communication platform is processing a request to start a synchronous communication session (e.g., PSTN, SIP, video, screen sharing or other form of communication session), a service can call out to the interface to inspect properties of the destination endpoint and modify the communication session initiation or the communication session.

Figure 2:
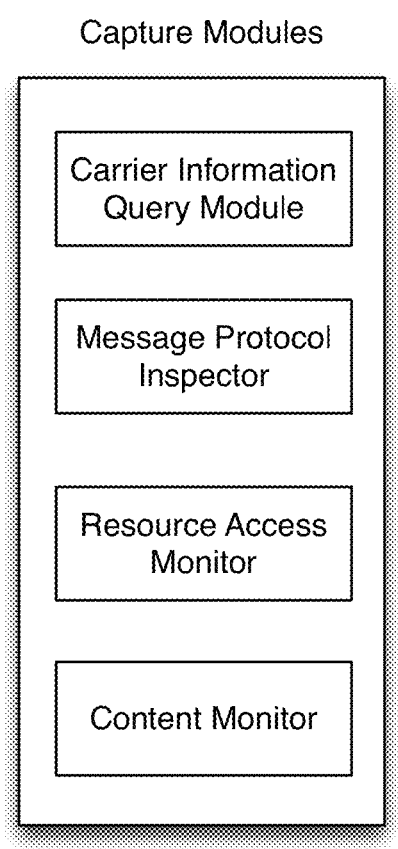
FIG. 2 is a detailed schematic representation of an exemplary set of capture modules.

The communication endpoint interface service can additionally include or communicate with information capture modules that function to retrieve, collect, and/or produce information of various communication endpoints. The capture modules may be a script, routine, process, or service operable on the interface service. Alternatively, the capture modules may be implemented in cooperation with another server and/or other suitable computing device. The information capture modules can collect information. In one variation, the operation of a communication platform (e.g., transmission/routing of communication, execution of communication applications, and the like) is used as one source of information. In another variation, one or more information capture modules collect information from outside sources. Various capture modules may be used in cooperation or individually. As shown in FIG. 2, one preferred set of capture modules can include a carrier information query module, a message protocol inspector module, a resource access monitor module, a content monitor module, and/or any suitable type of capture module.

A carrier information query module functions to access outside carrier information of the communication endpoint. The carrier information query module is preferably configured to communicate using $MM_4$ or MMSC to access endpoint information from outside carriers. Alternatively, if the communication platform is the MMSC then the information may be accessed directly from within the communication platform. In another variation, outside data providers may provide an API or any suitable interface to obtain information. Multiple data providers could additionally be used.

A message protocol inspector module functions to pull information from protocol responses that contain information. For example, the MMS notification response may include device related information that can be captured and stored. Similarly, when an inbound message, in particular a MMS message, is received, the message package may include information that can be extracted. For example, the user-agent used when sending an MMS may be observed and collected.

A resource access monitor module functions to use ancillary hosted resources that correlate with communications to obtain information. Ancillary hosted resources can include media hosting, link redirecting service (e.g., link shortening), two-factor authentication service, and/or other hosted resources/services. The ancillary hosted resources are preferably used in combination with communications to an endpoint, and then a recipient of the communication will access the hosted resource using an application or browser. This out-of-communication access can be mapped to the device used in the communication, and information from this access can be associated with the communication endpoint.

A content monitor module functions to inspect the communications (context and content) occurring within the communication platform, and detecting patterns in the communication. The content monitor module can be used to identify language patterns, if certain types of messages failed, preferred communication endpoints (e.g., who and where does a particular communication endpoint communicate with). For text messages, the message text content transmitted to or from an endpoint can be used as an indication of languages and interests. In voice communications, text-to-speech audio may be processed according to the text directives. Speech detection can additionally or alternatively be used. In a manner similar to the resource access monitor, the implied access of a resource reference may be used as a signal of endpoint information. In particular, application links can be used as a signal that the recipient device supports that particular app. For example, if an app store link is sent to a first endpoint, then the operating system associated with that app store link may be used as endpoint information. The actual target application, website, or other resource of the resource reference may additionally be used as implied endpoint information. For example, a link to a camera application can be used as a signal that the endpoint is associated with a device with a camera.

The telephony endpoint repository functions to store communication endpoint data. A communication endpoint preferably has a record stored in a database or distributed through several database tables. An endpoint record may include various properties of a communication endpoint such as a unique identifier of the telephony endpoint, the direct inbound address (e.g., the phone number or short code), carrier, origin properties, a cleanliness/quality score, capability properties (e.g., SMS, MMS, Fax, etc.), status (e.g., mobile, landline, client application type, toll free, etc.), screen resolution and display capabilities, language, service plan (e.g., do they get free SMS/MMS messages), activity patterns (e.g., when is the communication, who does the endpoint communicate with, what does the endpoint communicate, etc.) and/or other suitable properties of a telephony endpoint. Origin properties can include NPs (e.g., area code), NXX (e.g., three digit vanity digits of a number), ISO country codes, region properties and/or any suitable origin properties. The records may include various sets of information depending on the information that is collected.

2. Methods for Providing a Communication Endpoint Information Service

Figure 3:
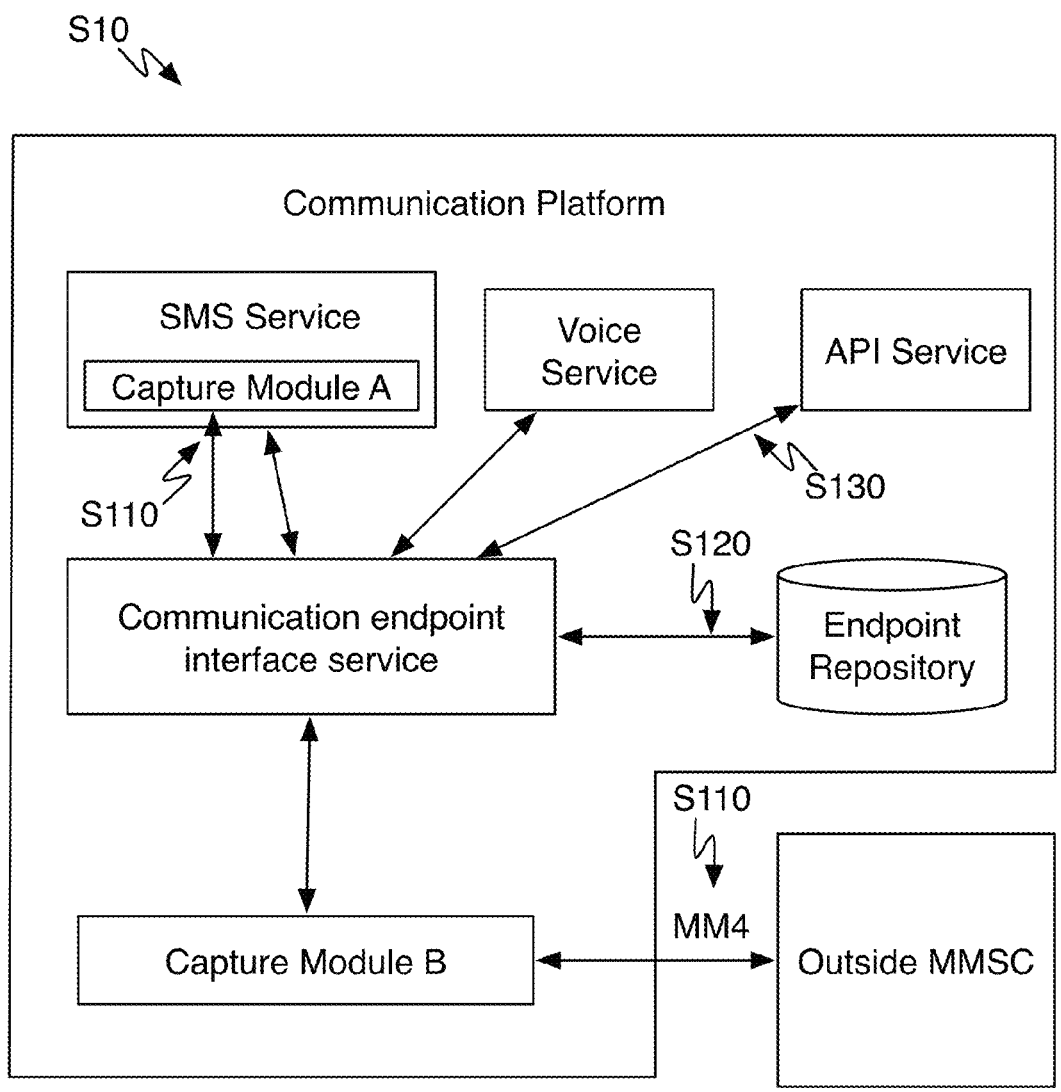
FIG. 3 is a schematic representation of method of a first preferred embodiment.

As shown in FIG. 3, a method for providing a communication endpoint information service of a preferred embodiment can include obtaining information of a telephony endpoint S110, storing the obtained information S120, and providing a communication endpoint interface service S130. The method functions to enable information of communication endpoints to be collected and accessed in a communication platform. The method can further function to unify several disparate types and forms of information relating to a telephony endpoint and transform the information into an actionable resource within a platform. The method is preferably implemented by the system described above, but any suitable system may alternatively be used to implement the method. Within the system above, the provided communication endpoint interface service can be used internally with a communication platform. Additionally or alternatively, the interface service can be exposed to outside partners, registered users, and/or the public. Not only can the method be used to collect information about communication endpoints owned, operated, and managed by the communication platform, but also the method may be used to construct a wide communication endpoint knowledgebase that expands to communication endpoints owned and operated by other parties.

Block S110, which includes obtaining information of a telephony endpoint, functions to retrieve, collect, and/or produce information of various communication endpoints. Information is preferably obtained from multiple sources and can employ multiple processes to obtain the information. Various processes of endpoint information collection can be performed at various information capture modules as described above, but the collection of information may alternatively architected within a communication platform in any suitable manner. The type of information obtained can relate to various properties of the communication endpoint. Preferably, the obtained information relates to functional and usage-based information such as the carrier, origin properties, a cleanliness/quality score, capability properties (e.g., SMS, MMS, Fax, PSTN voice, SIP voice, video, etc.), status (e.g., mobile, landline, geographic association(s), client application type, toll free, etc.), device type, application type, device/application features (e.g., camera, audio capabilities, media playing capabilities etc.), screen resolution and display capabilities, language, service plan (e.g., do they get free SMS/MMS messages, a data plan, etc.), activity patterns (e.g., when is the communication, who does the endpoint communicate with, what does the endpoint communicate, user preferences etc.), and/or other suitable properties of a telephony endpoint. As shown in FIG. 4, the properties of an endpoint information record can be populated with various properties.

Furthermore, an endpoint may be associated with multiple devices and/or applications as shown in FIG. 5. Accordingly, the method may comprise obtaining device information of an endpoint across multiple devices used with the endpoint. Endpoint information can additionally be obtained across multiple applications. Capabilities, usage patterns, and other endpoint information properties are preferably tracked for each device/application in a set of possible endpoint devices/applications. For example, the preference of a user to use one device over another device can be tracked per endpoint. Endpoints change owners periodically. Accordingly, the history of an endpoint can similarly be information obtained through tracking and processing endpoint information. In one implementation, an endpoint information record can include a data structure as a set of devices (if known), where each device can include a set of properties known or predicted for that device of the endpoint. The information may be structured as a dictionary. The properties of the endpoint information object can have different policy settings so different entities have different access. For example, internal services may be able to access the full set of properties and information, while a subset of basic information may be available through a public API.

The communication endpoint interface service preferably updates information when the communication endpoint is encountered during operation of the communication platform. A communication endpoint is encountered when receiving an endpoint query request of a communication event. The endpoint query request preferably indicates that the endpoint has some role in the particular communication event. The communication event can include attempting to make an outgoing communication from the communication endpoint, when receiving an inbound communication directed at the communication platform, merging a communication endpoint with a communication session (e.g., adding to a conference call), when asynchronously querying information of the communication endpoint, and other various steps in operation of the communication platform. The communication can be synchronous (e.g., PSTN call, SIP, video, screen sharing, etc.) or asynchronous communication (e.g., SMS, MMS, instant messaging, or media messaging). The communication endpoint interface service, as described above, is preferably an intermediary layer used by other services of a platform. API calls are preferably made to inspect various aspects like routing information, application URI's, and other information. The interface service preferably uses inspecting of the API calls to trigger some events. An eventing system may be used to inspect and respond to various types of API calls. Other components (i.e., capture modules) may be integrated into other portions of the system so that information can be reported back to the records of the communication endpoint repository.

The obtained information can be obtained/updated periodically, during initial access of the telephony endpoint, during any action that touches or augments a record of a telephony endpoint, or at any suitable time. Some basic information, like carrier information, may be obtained upon adding/porting the communication endpoint to the communication endpoint. In one variation, communication endpoints are tested (e.g., functionality tests) or measured for cleanliness, and these quality scores can be added as a parameter of communication endpoint information. Obtaining information of a telephony endpoint can include querying outside telephony information services, extracting information from a message notification response, synchronizing resource access of messages, aggregating usage history information, and/or other techniques for acquiring information about a communication endpoint.

Querying outside telephony information service functions to aggregate information from an existing information database. Carriers can provide APIs for accessing basic information of a communication endpoint. Querying an outside telephony information service can include using an inter carrier protocol such as $MM_4$. Alternatively, the information may be accessed from an MMSC. In another variation, the method may be implemented by an MMSC and thus the information is available from within the system. In one exemplary scenario, a MMS module may be prompted to send a MMS message. The MMS module, upon determining a destination endpoint, preferably calls out to the communication endpoint interface service to determine properties of the destination endpoint. If the information is not already stored, the endpoint interface service can access carrier information through MMR for the destination endpoint. This information may include carrier network of the destination endpoint, if the device is MMS enabled, and if the endpoint has a messaging plan. The information about the destination endpoint can be used in determining if and how a message is delivered.

Extracting information from a message notification response functions to use messaging protocol response messages in determining information about the receiving device. Preferably, transmitting an MMS message includes message passing that includes information about the destination endpoint. The relevant information is preferably extracted from the protocol messages and stored in record for the destination endpoint. When transmitting a MMS message, a MMSC will determine if the destination is MMS capable. In some instances, the response messages can include header information that specifies or indicates information relating to the receiving device. For example, with $MM_7$ protocol communication, user-agent information can be obtained through use of the protocol. Similarly, $MM_4$ can be used to obtain information from inbound messages. In particular, the acknowledgment messages delivered during handshaking of MMS messaging can include a user agent related header field. Extracting information from a message notification response may include integrating with communication components. The communication component preferably synchronizes desired information with the communication endpoint interface service or the endpoint repository. In the above example, a MMS messaging module handles the messaging protocol and transmission of multimedia messages. The MMS messaging module may expose a programmatic hook to observe the acknowledgment header information. Alternatively, the MMS messaging module may actively call out to the communication interface service when a protocol message with desired information is identified. Information from message notification responses can preferably be extracted from any suitable destination endpoint. For example, user agent information can be collected for outside communication endpoints as well as owned communication endpoints.

As a related variation, obtaining information of a telephony endpoint may include detecting device information from incoming communication message. In the messaging protocol and assets passed during message delivery, various endpoint properties may be exposed. In particular, when receiving a MMS message from an endpoint, the user-agent of the transmitting device may be collected.

Figure 6:
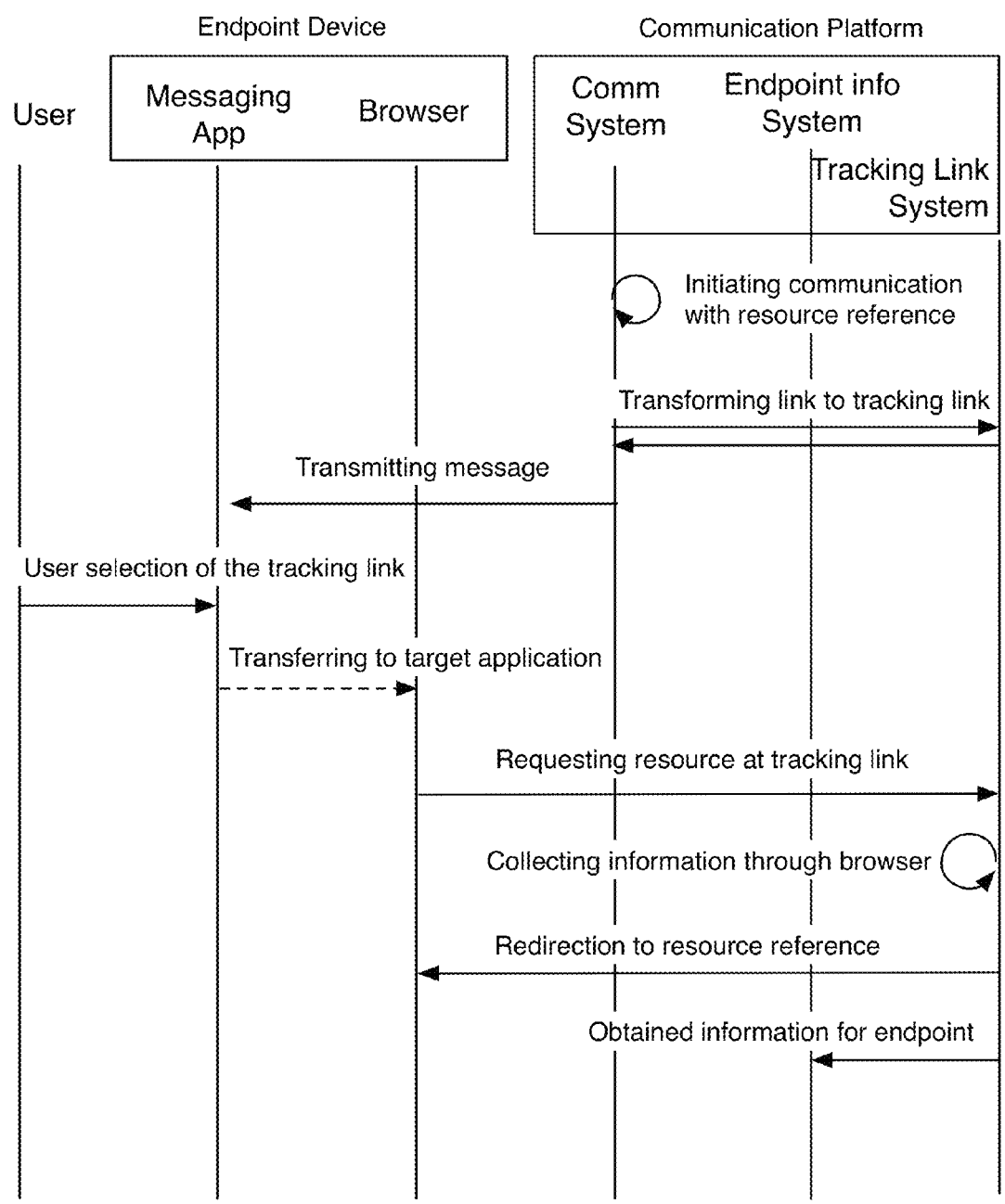
FIG. 6 is a communication flow diagram of collecting endpoint information through access of a resource reference.

Synchronizing resource access of messages functions to use access of external media by a first device to correlate to the device of the destination endpoint. Synchronizing resource access can include adding a trackable resource reference into a content field of a communication to an endpoint and obtaining device information associated with access of the resource reference. In one variation, an original resource reference is detected in the communication, and a redirection URI is created an inserted to replace the original resource reference. In another variation, a trackable resource reference may be added to the communication content. Preferably, the access of the resource reference depends on a user actively attempting to access the resource and using a tracking link to detect and collect information as shown in FIG. 6. This can enable information to be collected that may not otherwise be available when transmitting to a destination endpoint. Alternatively, the access may be implied just in the transmission of the resource reference. For example, the type of application referenced in the content of an SMS message (e.g., an app store, or calendar app, etc.) may provide some implied information. The content of the referenced to resource may additionally or alternatively provide implied information. In the initial variation, obtaining information preferably involves employing a secondary service that works with or facilitates transmission of a MMS, SMS, or alternative form of device message. The message will preferably be modified to include a reference to a platform-hosted resource. The platform-hosted resource is preferably linked or referenced such that a second application is used to open the link. There are various ways of using a platform-hosted resource to result in second application access from which information may be obtained. In a first variation, a link shortening service is provided by the communication platform. Accordingly, synchronizing resource access of messages can include transforming the resource reference into a tracking link (i.e., a trackable resource reference); and in obtaining device information, inspecting endpoint device information during access of the tracking link and redirecting to the resource reference. Any SMS or MMS messages that pass through the communication platform can be detected and converted into controlled links to unique proxy tracking URI's. The tracking URI (i.e., redirection URI) is preferably unique to the particular destination endpoint so that any access of the link can be correlated with the particular destination endpoint or even communication message. When a user accesses the URI (e.g., activating the link displayed in a text messaging app), a browser can opens up the shortened link on the device. During a browser session, the user agent, screen size, location information, and other information from the HTTP headers, JavaScript or other suitable techniques can be collected. Various capability tests can be run within the browser to verify particular capabilities. JavaScript may execute various checks to determine different capabilities of the device. Alternatively, an alternative non-browser application may open the URI and collect information.

Figure 7:
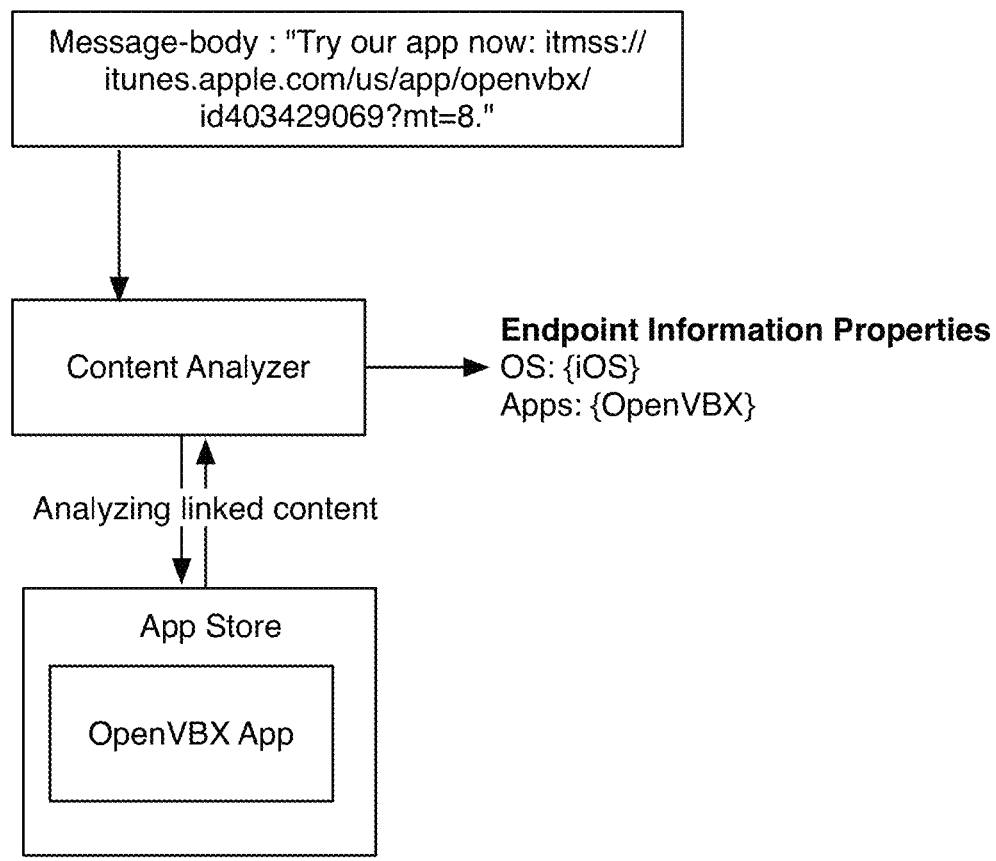
FIG. 7 is a schematic representation of collecting endpoint information from content of the referenced resource.

Synchronizing resource access can additionally or alternatively include processing the target application resource of the resource reference and determining at least one property of endpoint information implied through the expected access of the resource reference as shown in FIG. 7. The target application processing preferably uses the presence of a resource reference as a signal of properties of the endpoint. Those properties may not be confirmed or directly observed. The target application resource is preferably used when the URI specifying an application schema which will be correspondingly opened by an application (and possibly not the browser). Such examples may include application download links of an application store, calendar events, social network applications, and other suitable applications. The type of application being linked to can be used as one signal. For example, Android and iOS devices may be differentiated based on the type of download links included in a message. Additionally, the destination content within the application can be processed and used to assign different properties. The content properties may be used to provide a set of user interest properties. For example, if a user receives a Sports app link, the endpoint information may be supplemented with properties that indicate an interest in sports and the corresponding OS of the endpoint. As such implied information may be incorrect or inaccurate at times, the endpoint information is preferably continuously re-evaluated and updated to provide predicted information.

Figure 8:
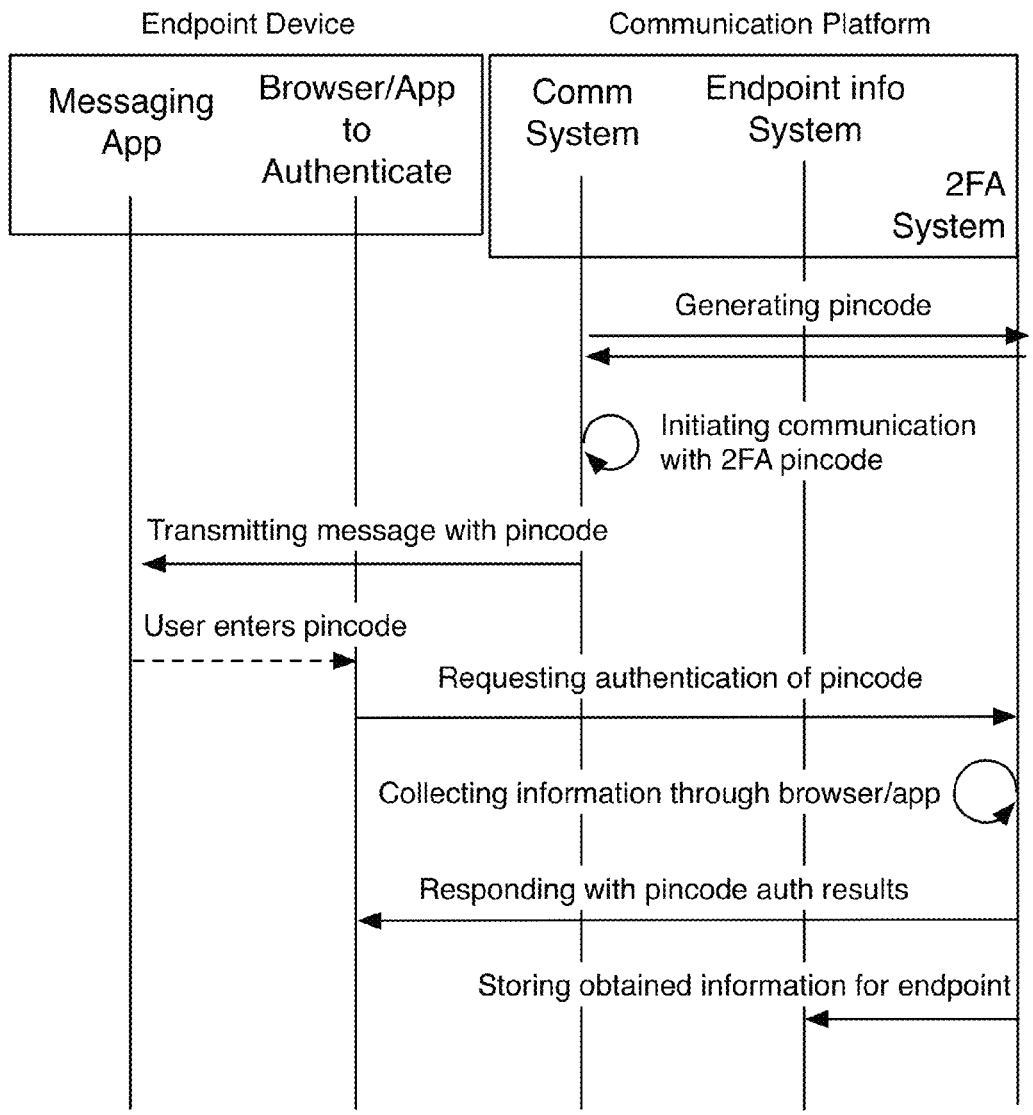
FIG. 8 is a communication flow diagram of a variation using a token validation service.

In another variation, a token validating service can be used in combination or within the communication platform as shown in FIG. 8. The token validating service is preferably used for pin codes in two-factor authentication, but may be used for other application-based code functionality. The token validating service will preferably generate a unique token/code for a destination endpoint. The token is preferably transmitted to the destination endpoint. The token code can then be entered into a mobile application that is assumed to be on the same device as the device of the destination endpoint. Information is preferably collected from the device during this access. A code validation service is preferably run by or in communication with the communication platform, and will gain access to evaluate the endpoint device during a code validation request. For example, the code validation portion of the application may run within an iframe in a browser view. In another variation, the destination endpoint may be configured for use by a client application (e.g., a mobile application). The mobile app preferably transmits device information to the communication platform for association with the destination endpoint.

Figure 9:
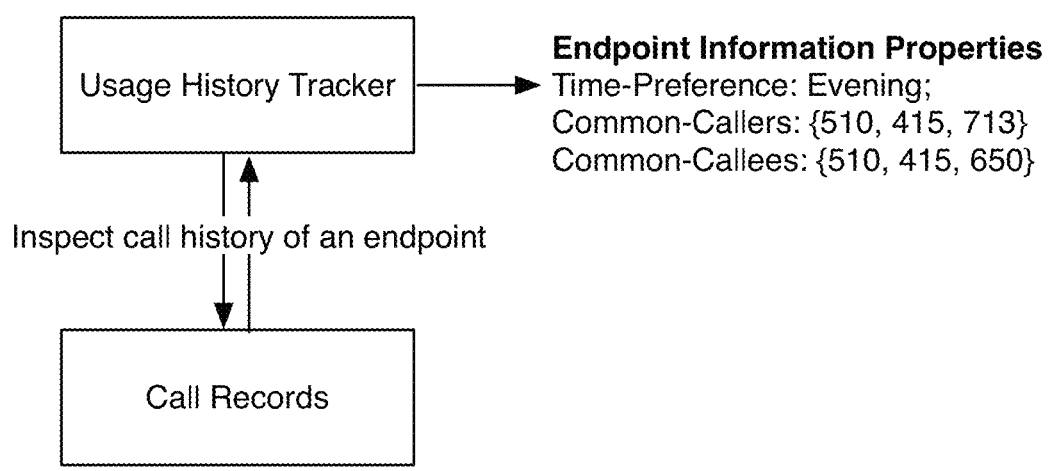
FIG. 9 is a schematic representation of a variation tracking usage activity of an endpoint.

Aggregating usage history information functions to characterize and/or use activity with the communication endpoint to contribute information about the communication endpoint as shown in FIG. 9. Usage history preferably includes monitoring endpoint usage activity—communications that involve the communication endpoint as an origin, destination, or other suitable participant of the communication. The usage activity is preferably used in generating endpoint usage pattern information as part of the endpoint information. Various forms of information can be obtained from usage history. The usage history is preferably used to characterize communication patterns or identify signals indicating capabilities. The usage history is preferably obtained through the communication platform.

In one variation, the use history includes communication transaction history, wherein the type of communications and the number of those communications can be used as a signal of communication abilities. Making outgoing communications is preferably a strong signal that the communication endpoint is configured to use that form of communication. For example, if a number of SMS messages originate from the communication endpoint, then that communication endpoint can be indicated as being SMS capable. This can similarly be performed for MMS, client messaging protocols, voice calls, video calls, screen-sharing calls, and/or any suitable form of communication. Furthermore, the number and/or frequency of the communications can be used to form a measure of those capabilities. This can function to infer phone plans for a communication endpoint without full visibility into the carrier contract of that endpoint. In one exemplary scenario, a first communication endpoint sends only one or two SMS messages in a month, and a second communication endpoint sends five hundred in a month. The first communication endpoint is preferably marked as a low volume SMS capable communication endpoint (e.g., the user does not like SMS messages and/or does not have a plan that includes many messages), and the second communication endpoint is marked as a high volume (e.g., the user prefers communicating over SMS and may have a pre-paid SMS plan). The measure can be a categorization such as "low volume" and "high volume", but the measure can additionally be a numeric measure based on usage data.

In another variation, aggregating usage history information can include processing geographic preferences of a communication endpoint. Area codes and country codes can work to provide insight into the geographic region associated with a communication endpoint. Processing geographic preferences of a communication endpoint can function to infer geographic associations based on communication involved in the communication. The communication endpoints that call a first endpoint and/or the communication endpoints that are called by the first endpoint can be used to create additional geographic associations for the first endpoint. The additional geographic associations are preferably based on the number, percentage, and/or frequency of calls that involve particular geographic regions. For example, endpoint A may make numerous calls to phone numbers with area codes belonging to San Francisco, Oakland, and Springfield, Mo. Phone calls in lower numbers may occur with other various locations. In response to the high frequency and number of calls to San Francisco, Oakland, and Springfield, Mo., these three regions are added to an information field for the communication endpoint. Additionally, timing of geographic preferences may additionally be used to determine geographic preference based on day of the week, month, time of day, and the like. Similarly, the geographic preferences can be characterized according to the duration of the calls, content of the messages, variety of endpoints (e.g., communicate with the same five communication endpoints or never call the same number more than a few times.), or other suitable patterns form related communication endpoints.

Figure 10:
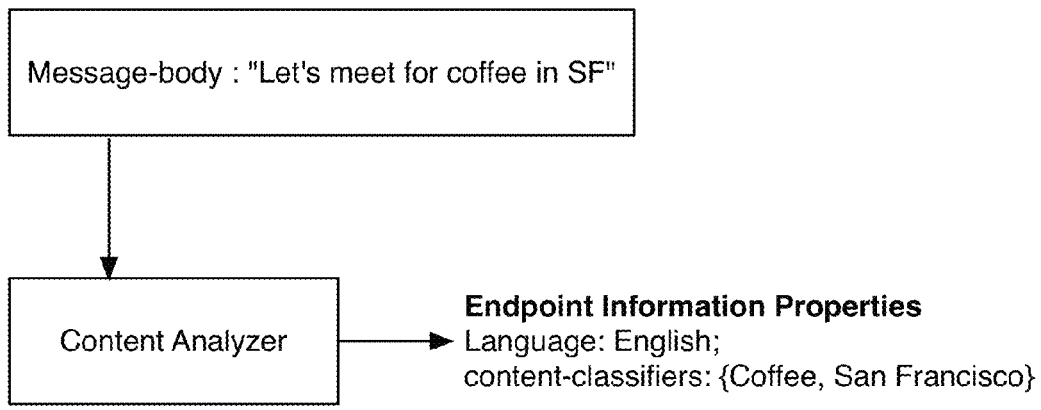
FIGS. 10 and 11 are schematic representations of variations processing content of a communication.
Figure 11:
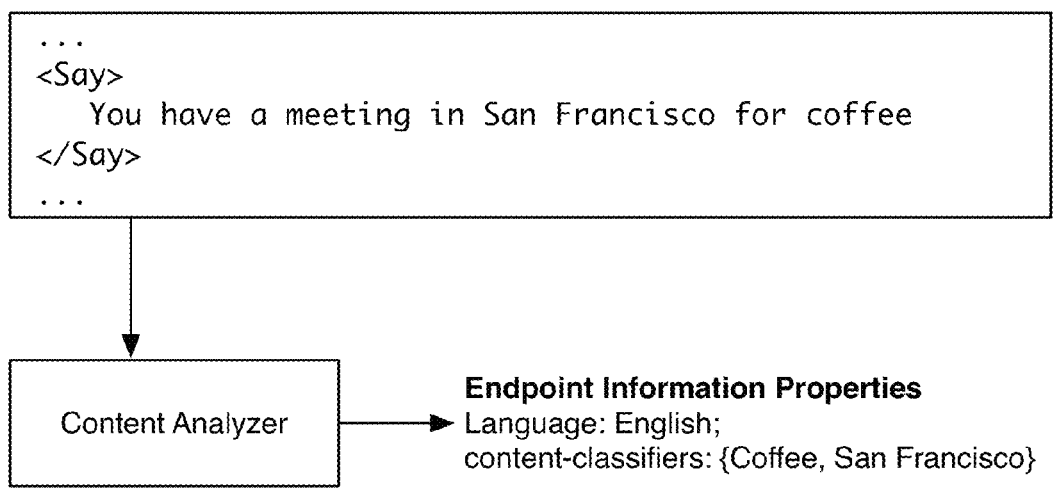

In another variation, monitoring endpoint usage activity can comprise processing content of a communication and generating at least one property of the endpoint information from the content. In one variation, the content is text or media content included in a message as shown in FIG. 10. The message can be a synchronous message or an asynchronous message. Processing the message content can include detecting language, performing keyword categorization/classification, analyzing referenced links or media, performing natural language processing (e.g., to identify sentiment or other information), and/or any suitable form of message content analysis. The messages may be SMS, MMS, or other forms of messages transmitted from the communication platform to a destination endpoint. But the messages may alternatively be received messages directed at the communication platform or for routing to another endpoint. The content endpoint information may be assigned to the sender, the receiver, and/or both. In a second variation, the content is synchronous communication such as voice, video, screen sharing, virtual reality media, and/or any suitable synchronous communication session. Processing synchronous content may use various speech recognition techniques, object recognition, or other forms of content detection. In the case where automated speech or automated video avatars are controlled, the content directives may be analyzed based on content. As in the example shown in FIG. 11, a text-to-speech directive in a voice communication application may be analyzed in a manner substantially similar to the message processing described above.

Block S120, which includes storing the obtained information, functions to maintain a record for a communication endpoint. Obtained information can be for communication endpoints owned or operated by the communication platform, but may additionally or alternatively include outside communication endpoints. Information about outside communication endpoints is preferably obtained by the communication platform when the communication endpoint facilitates a communication involving the communication endpoint. For example, if a communication endpoint operated by the communication platform calls the outside communication endpoint, then information about that outside communication endpoint may be collected through that communication session. The information of the communication endpoint is preferably stored in a database system. The data structure for the information can be architected in any suitable manner.

Preferably, a communication endpoint includes a number of basic parameters that can be completed through knowledge of just the address of the communication endpoint. A record for a communication endpoint can include the direct inbound address, carrier, country from country code, region from area code, screen resolution, service plan, SMS capability, MMS capability, voice capability, voice protocol (e.g., PSTN, SIP, etc.), video capability, screen sharing capability, device type, device applications, application, geographic preferences (e.g., who does the user communicate with), communication usage rates, user information, presence information (e.g., a communication endpoint simultaneously assigned to multiple devices), languages, and/or other suitable information. Some information of the communication endpoint is substantially static such as country code, and area code region. Some information may alternatively be continuously updated or changed for various reasons. Various devices and/or applications may share the use of an endpoint. For example, a mobile phone may have the same communication endpoint as a tablet.

Block S130, which includes providing a communication endpoint interface service, functions to enable access and interactions with the information of the communication endpoint. The communication endpoint interface service preferably provides an internal API used by the components within the communication platform. The API may additionally or alternatively be a public API. In one variation, a portion of the API can be exposed for public access. The public access API is preferably facilitated by a public API module for the communication platform, and the public API module fulfills endpoint information calls by using the internal API of the communication endpoint interface service. The API of the interface is preferably a RESTful API but may alternatively be any suitable API such as SOAP. The API preferably works according to an HTTP request and response model. HTTP requests (or any suitable request communication) to the interface service preferably observe the principles of a RESTful design. The interface of the communication endpoint interface service is preferably used for querying information of a particular communication endpoint. For example, an API call may request a True/False response indicating if the communication endpoint is MMS capable. Additionally or alternatively, the communication endpoint interface service can facilitate API calls that alter the information of the communication endpoint. For example, information feedback can be supplied through the API. Mutative API calls may be used by internal components of the communication platform that cooperate in obtaining information of the communication endpoint. In one variation, the API calls provide the supplemental information as a sub-resource of a communication. For example, to obtain information about a device, a REST API call may be sent to a URI of the pattern "http"_____:_____"// . . . / . . . /Message/{MessageSID}/DeviceInfo" or to obtain information about the carrier involved the URI may be "http"_____: "_____/ . . . / . . . /Message/{MessageSID}/CarrierInfo". In another variation, an API may request a structured data file (JSON) with information about communication. The request can include a parameter to specify that the additional endpoint related information should be included in that structured data file.

The obtained endpoint information can further be used in altering operation of a communication platform. The method preferably includes receiving an endpoint query request of a communication event and augmenting the communication event according to the information stored for an associated endpoint. The endpoint query request preferably occurs during the transmission or routing of a communication. The communication platform will include communication routing/processing logic that will depend on information about an endpoint. The endpoint query request will preferably specify or reference at least one endpoint. The endpoint information for the associated endpoint is accessed and then can be used to influence the communication. In one exemplary use case, the operating system of a device of an endpoint may be obtained, and then the content type can be altered. For example, a developer application may submit a request with the intent of delivering a boarding pass. If the operating system is known and there is particular media type that supports boarding pass type content (such as a passbook application), then the content is converted into a passbook file format. The content is preferably reactively adapted based on the endpoints. This preferably abstracts away the complexities of multiple protocols for developers, and a developer can simply specify what their intent is for the communication. This content adaption can similarly be performed for other forms of content such as calendars, tasks, multimedia files, maps, tickets, or other forms of content, which may have specific device applications for handling.

Figure 12:
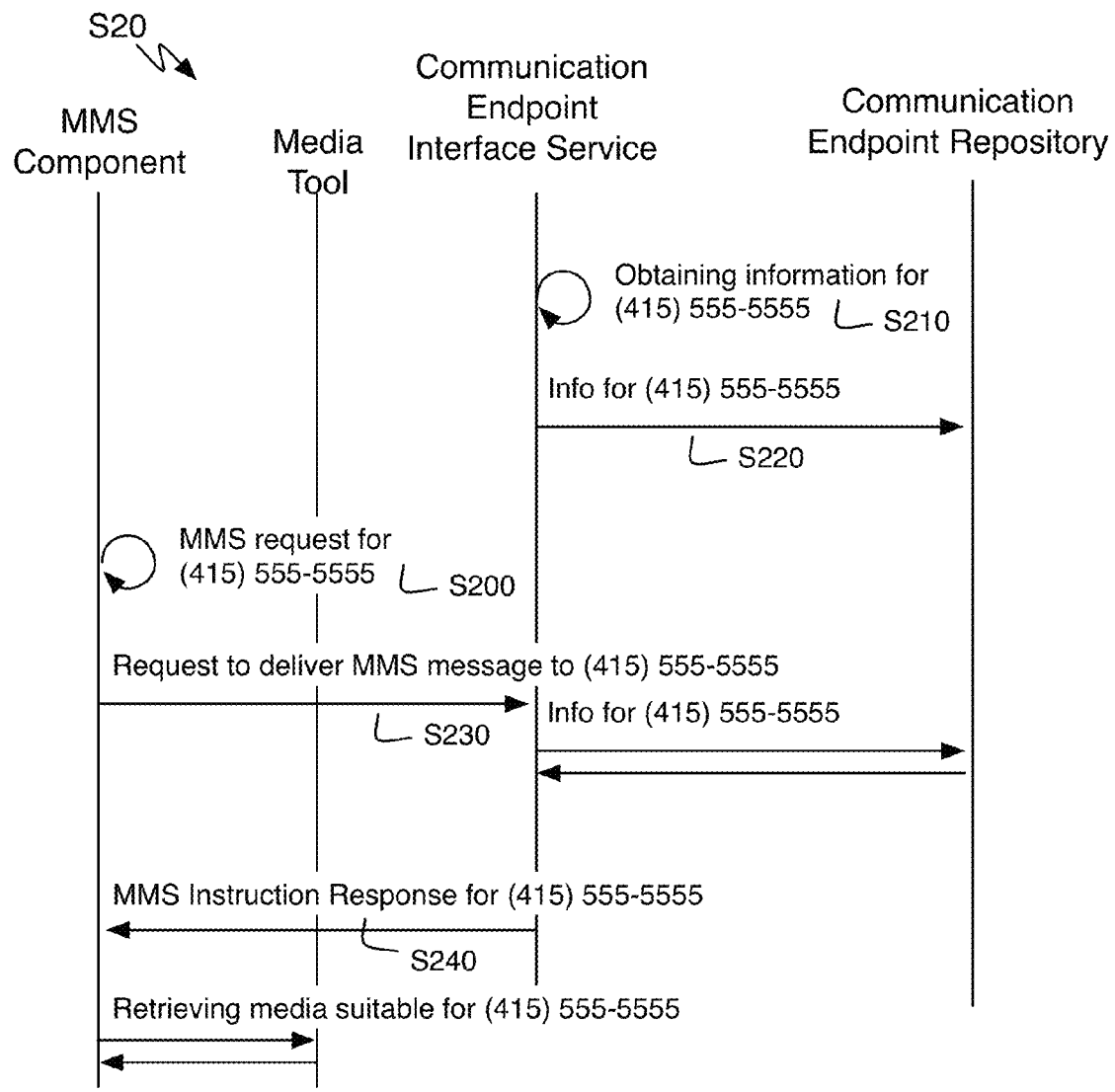
FIG. 12 is a schematic representation of a method of a second preferred embodiment.
Figure 13:
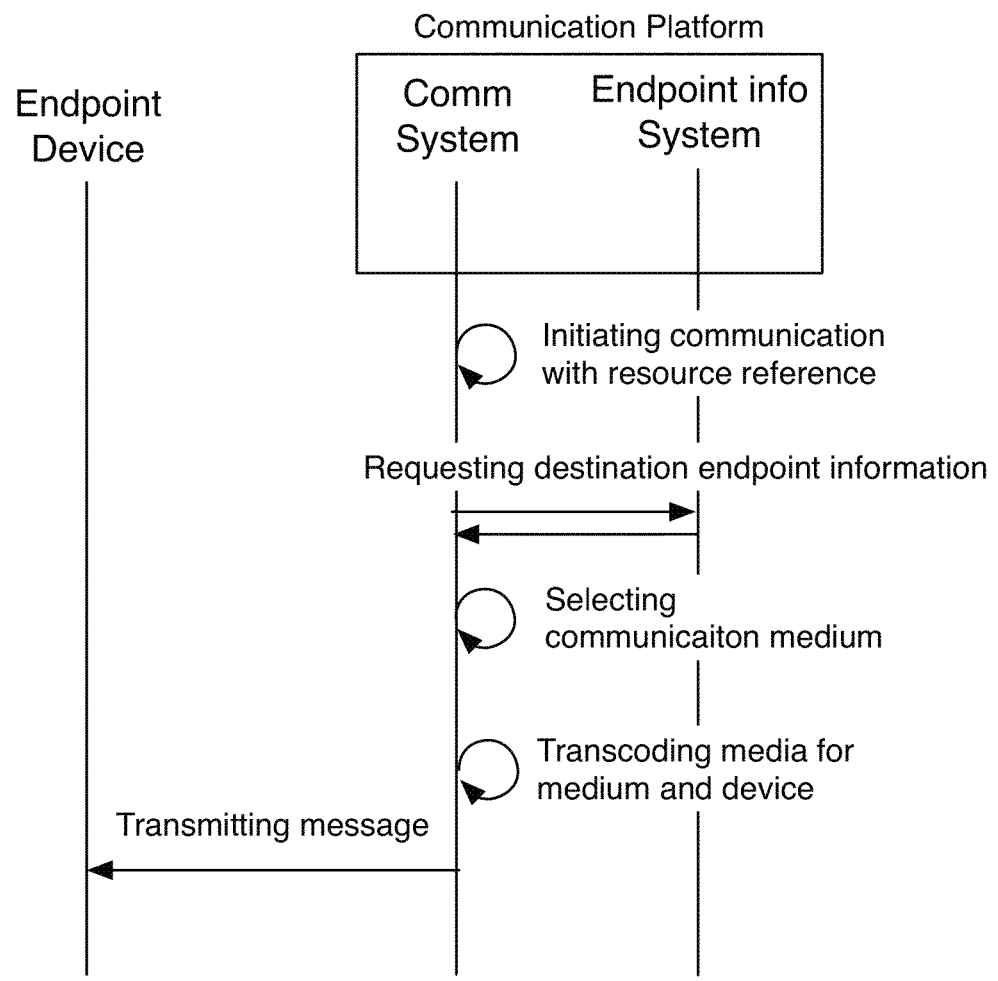
FIG. 13 is a communication flow diagram augmenting a communication event.

As shown in FIG. 12, a method S20 for providing telephony endpoint information can include receiving a telephony endpoint query request of a communication event S200, providing a communication endpoint interface service S230, obtaining information of a telephony endpoint S210, storing the obtained information S220, and augmenting the communication event according to the obtained information S240. Method S20 expands upon the functionality of method S10 to enable information of communication endpoints to be collected, accessed, and automatically used in operational logic of a communication platform. In a preferred implementation, the method is used for multimedia messaging (e.g., MMS) applications, where the media can be customized to accommodate device capabilities for the receiving endpoint. In an alternative implementation, the method can be used to automatically adjust communication language (e.g., text or spoken) based on properties of the communication endpoint. Blocks S230, S210, and S220, function to create the endpoint repository. Blocks S230, S210, and S220 are substantially similar Blocks S130, S110, and S120, respectively. Preferably, information about a communication endpoint is collected prior to the communication that is augmented by the information. Alternatively, information about a communication endpoint can be collected on-demand (i.e., in response to or during a communication session). In addition to providing a communication endpoint interface service usable by various components, the interface service generated through blocks S210 and S220 can be integrated into operation of the communication platform in various ways.

Block S200, which includes receiving a telephony endpoint query request of a communication event, functions to initiate communication endpoint influence on a communication session. The communication platform is preferably used to facilitate an application (e.g., an automated phone service, phone tree, number redirection tool, and the like). The communication session (and possibly the application state) may be handed by a call router or other suitable component(s) of the communication platform. Prior to or during a communication session with a communication endpoint, the call router will make an internal API call to the communication endpoint interface service. The call is preferably made for information that will conditionally influence the state of the communication. In one variation, the components of the communication platform will simply request the information, the interface service provides requested information, and the components then use that information to determine a response. In this variation, the query request is preferably for particular types of information of a communication endpoint or endpoints. Alternatively, the interface service may enforce the actions involving a communication endpoint. In this variation, the action taken on the communication endpoint is communicated through the API of the interface service, and the interface service includes application logic to determine proper response to actions involving a communication endpoint. By centralizing the application logic to the interface service, a central policy can be enforced so that conditional logic based on communication endpoint information is kept consistent throughout the communication platform.

Block S240, which includes augmenting the communication event according to the obtained information, functions to react to the query request and alter a communication. In one variation, augmenting the communication event can include selecting a media format in the communication, which functions to transcode, translate, or generate media that targets media capabilities of the endpoint. The media format is preferably selected according to device capabilities from the endpoint information. In another variation, augmenting the communication event can include selecting a communication medium format, which functions to alter the mode of communication (e.g., SMS, MMS, voice, video, etc.). As another variation, the augmenting of a communication event can be used in negotiating a common or compatible format of communication. Various approaches may be used in facilitating use of the endpoint information to augment a communication. Preferably, intent to communicate is expressed or triggered within the communication platform and then the communication platform determines how to execute the communication. Access of the endpoint information is preferably used during or prior to negotiating a communication. The method preferably includes receiving an endpoint query request that specifies at least one involved endpoint.

In one variation, augmenting the communication event can include validating a communication request. For example, the endpoint capabilities of an endpoint can be validated prior to performing an action that depends on those capabilities. Various alternative communication options can be triggered if capabilities of the endpoint are not sufficient. If a communication cannot be completed, an error message or an alternative action can be triggered. For example, a MMS server may be prompted to send an MMS message to a destination endpoint. The information for the destination endpoint is queried and if the information indicates that the endpoint is capable of MMS communication, the MMS message is delivered. If the information on the endpoint indicates the endpoint is not capable of MMS communication, an error message is delivered. In one variation, this response is delivered to a developer application. An option to send the MMS as a link in an SMS message can be an optional action from this error message. Similarly, options to attempt the MMS message disregarding the warning or to cancel the message may additionally or alternatively be option responses. In another variation, the media used in the communication can be customized to the capabilities of a device. Preferably screen size/resolution can be used to dynamically generate media prior to communicating the media to the endpoint. The smart media formatting can be used for MMS messages, but may additionally be used in video, screen sharing, or other rich media communications. In one implementation, a MMS component is prompted to transmit a MMS message. A media tool (e.g., such as a headless browser or an image rendering service) may be used to generate the image or media. The screen resolution of the device for the endpoint is preferably queried from the endpoint repository and delivered as input to the media tool. An image or other suitable media file is preferably dynamically generated or selected for delivery to the endpoint. If the device has a resolution of 320×480, then the image is preferably generated to that resolution and aspect ratio. If the screen resolution is 1024×768, then the image is generated for that resolution and aspect ratio. Alternatively, instead of generating the media, the media may be transcoded according to the information of the device. The information for the communication endpoint can additionally be used for automatic translation of messages to a preferred language of the communication endpoint; prioritize communications between calls, SMS, and MMS; alter communication routing within the system; change the content of communication; change frequency and timing of communication; and/or use the information in any suitable manner to alter the communication with the communication endpoint. The form of communication augmentation can be used in any suitable alternative manner.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the communication endpoint interface service. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for communicating at a communication platform comprising:

obtaining information of a first telephony phone number endpoint through a set of information collection processes, the information including endpoint device information;

in a first information collection process, adding a resource reference in a content field of a communication to a first telephony phone number endpoint, detecting access of the resource reference, and obtaining telephony phone number endpoint device information during the access of the resource reference, wherein the telephony phone number endpoint device information obtained during the access of the resource reference includes at least device type;

storing the obtained information in an endpoint repository; and receiving an endpoint query request that is associated with a communication transmission to an outside telephony phone number endpoint, the endpoint query request being provided by a communication service and the request requesting device information of the outside telephony phone number endpoint;

responsive to the endpoint query request, accessing device information for the outside telephony phone number endpoint from the endpoint repository, the accessed device information including at least device type and device capabilities of at least one endpoint device associated with the outside telephony phone number endpoint;

providing the device information accessed from the endpoint repository to the communication service; and augmenting the communication transmission for the outside telephony phone number endpoint according to at least one of device type and device capabilities of at least one endpoint device specified in the accessed endpoint device information accessed from the endpoint repository, the augmenting being performed by the communication service, wherein obtaining telephony phone number endpoint device information during the access of the resource reference comprises inspecting a user-agent of an application accessing the resource reference and running a set of capability tests within the application.

2. A method for providing a telephony endpoint information service at a communication platform comprising:
obtaining information of a first telephony phone number endpoint through a set of information collection processes, the information including endpoint device information, obtaining information of the first telephony phone number endpoint comprising:
adding a trackable resource reference in a content field of a communication to the first telephony phone number endpoint,
obtaining device information during access of the trackable resource reference based on user-agent information included in a request to access the trackable resource reference, the request to access the trackable resource being received at the communication platform, the user-agent information identifying an application, and
running a set of capability tests within the application;
storing the obtained information in an endpoint repository;
receiving an endpoint query request of a communication event for device information of the first telephony phone number endpoint, the endpoint query request being provided by a communication service, wherein the endpoint query request specifies at least the first telephony phone number endpoint;
responsive to the endpoint query request, accessing device information for the first telephony phone number endpoint from the endpoint repository, the accessed device information including at least device type and device capabilities of at least one endpoint device associated with the first telephony phone number endpoint; and
providing the device information accessed from the endpoint repository to the communication service.

3. The method of claim 2,
wherein the communication event is augmented for the first telephony phone number endpoint according to at least one of device type and device capabilities of at least one endpoint device specified in the device information accessed from the endpoint repository, the augmenting being performed by the communication service,
wherein the communication event is a transmission of a communication to the first telephony phone number endpoint; and wherein augmenting the communication event comprises altering the content of the communication,
wherein altering the content of the communication comprises selecting a media format used in communication, wherein the media format is selected according to device capabilities of at least one device specified in the device information of the first telephony phone number endpoint that is accessed from the endpoint repository.

4. The method of claim 2,
wherein the communication event is augmented for the first telephony phone number endpoint according to at least one of device type and device capabilities of at least one endpoint device specified in the device information accessed from the endpoint repository, the augmenting being performed by the communication service,
wherein the communication event is transmission of a communication to the first telephony phone number endpoint; and wherein augmenting the communication event comprises selecting a communication medium format, wherein the communication medium format is selected according to device capabilities of at least one device specified in the device information of the first telephony phone number endpoint that is accessed from the endpoint repository.

5. The method of claim 2,
wherein the communication event is augmented for the first telephony phone number endpoint according to at least one of device type and device capabilities of at least one endpoint device specified in the device information accessed from the endpoint repository, the augmenting being performed by the communication service;
wherein augmenting the communication event comprises selecting a communication route according to device information.

6. The method of claim 2,
further comprising detecting an original resource reference and replacing the original resource reference with the trackable resource link; and wherein obtaining device information during access of the resource reference comprises inspecting endpoint device information during access of the tracking link and redirecting to the original resource reference,
wherein the original resource reference is an internet URI and the trackable resource reference is a redirection URI.

7. The method of claim 2, further comprising, in a second information collection process, monitoring endpoint usage activity, and generating endpoint usage pattern information as part of the information of the first telephony phone number endpoint.

8. The method of claim 7, wherein monitoring endpoint usage activity comprises processing content of a communication message; and wherein generating endpoint usage pattern information comprises generating at least one property of the information of the first telephony phone number endpoint from the content.

9. The method of claim 7, wherein monitoring endpoint usage activity comprises processing content of a synchronous communication session; and wherein generating endpoint usage pattern information comprises generating at least one property of the information of the first telephony phone number endpoint from the content.

10. The method of claim 7, further comprising extracting information from a message notification response, detecting device information from incoming media communication, and retrieving information of the first telephony phone number endpoint from an outside data management source.

11. The method of claim 7, further comprising detecting an original resource reference; and wherein monitoring endpoint usage activity comprises processing a target application resource of the original resource reference and determining at least one property of information of the first telephony phone number endpoint implied through the expected access of the resource reference.

12. The method of claim 2, further comprising obtaining device information of the first telephony phone number endpoint across multiple devices used with the first telephony phone number endpoint, the device information being accessed from the endpoint repository.

13. The method of claim 12, wherein collecting device information further comprises determining device preference within the set of devices according to frequency of usage.

14. The method of claim 12, wherein the information of the first telephony phone number endpoint includes capability properties; and
wherein capability properties are mapped to a particular device of the first telephony phone number endpoint.

15. The method of claim 2,
further comprising providing an HTTP communication telephony phone number endpoint interface to the stored information of the first telephony phone number endpoint,
wherein providing the communication telephony phone number endpoint interface comprises receiving an information request for the first telephony phone number endpoint, the request received asynchronous to a communication with the first telephony phone number endpoint, and responding to the request with information of the first telephony phone number endpoint that is accessed from the endpoint repository.

16. The method of claim 2, wherein information stored in the endpoint repository includes information obtained for telephony phone number endpoints managed by the communication platform; and wherein information stored in the endpoint repository includes information obtained for telephony phone number endpoints that are communicated with by telephony phone number endpoints managed by the communication platform.

17. The method of claim 2, wherein the device information accessed from the endpoint repository indicates at least one media format capability of at least one device associated with the first telephony phone number endpoint.

18. The method of claim 2, wherein, the communication service is at least one of a PSTN, SIP, video, screen sharing, SMS, MMS, instant messaging, and media messaging communication service.

19. The method of claim 18, wherein the device information accessed from the endpoint repository indicates at least one of an SMS and a MMS messaging capability of at least one device associated with the first telephony phone number endpoint.

20. The method of claim 2,
wherein the communication service is a communication service of the communication platform, and
wherein the communication platform includes a call router.

21. The method of claim 2, further comprising: augmenting the communication event for the first telephony phone number endpoint according to at least one of device type and device capabilities of at least one endpoint device specified in the device information accessed from the endpoint repository, the augmenting being performed by the communication service.

22. A method for providing a telephony endpoint information service at a communication platform comprising:
obtaining information of a first internet protocol (IP) communication address endpoint through a set of information collection processes, the information including endpoint device information, obtaining information of the first IP communication address endpoint comprising:
adding a trackable resource reference in a content field of a communication to the first IP communication address endpoint,
obtaining device information during access of the trackable resource reference based on user-agent information included in a request to access the trackable resource reference, the request to access the trackable resource being received at the communication platform, the user-agent information identifying an application, and
running a set of capability tests within the application;
storing the obtained information in an endpoint repository;
receiving an endpoint query request of a communication event for device information of the first IP communication address endpoint, the endpoint query request being provided by a communication service, wherein the endpoint query request specifies at least the first IP communication address endpoint;
responsive to the endpoint query request, accessing device information for the first IP communication address endpoint from the endpoint repository, the accessed device information including at least device type and device capabilities of at least one endpoint device associated with the first IP communication address endpoint; and
providing the device information accessed from the endpoint repository to the communication service.

23. The method of claim 22,
wherein the communication event is augmented for the first IP communication address endpoint according to at least one of device type and device capabilities of at least one endpoint device specified in the device information accessed from the endpoint repository, the augmenting being performed by the communication service,
wherein the communication event is a transmission of a communication to the first IP communication address endpoint,
wherein augmenting the communication event comprises altering the content of the communication,
wherein altering the content of the communication comprises selecting a media format used in communication, and
wherein the media format is selected according to device capabilities of at least one device specified in the device information of the first IP communication address endpoint that is accessed from the endpoint repository.

24. The method of claim 22,
wherein the communication service is at least one of a PSTN, SIP, video, screen sharing, SMS, MMS, instant messaging, and media messaging communication service,
wherein the device information accessed from the endpoint repository indicates at least one of an SMS and a MMS messaging capability of at least one device associated with the IP communication address endpoint,
wherein the communication service is a communication service of the communication platform, and
wherein the communication platform includes a call router.

25. The method of claim 22, further comprising: augmenting the communication event for the first IP communication address endpoint according to at least one of device type and device capabilities of at least one endpoint device specified in the device information accessed from the endpoint repository, the augmenting being performed by the communication service.

* * * * *